United States Patent
Drugge et al.

(10) Patent No.: US 7,786,710 B2
(45) Date of Patent: Aug. 31, 2010

(54) ELECTRIC POWER FLOW CONTROL

(75) Inventors: Birger Drugge, Västerås (SE); Per Halvarsson, Västerås (SE); Lars Liljestrand, Västerås (SE); Magnus Backman, Västerås (SE)

(73) Assignee: ABB Technology Ltd., Zürich (CH)

( * ) Notice: Subject to any disclaimer, the term of this patent is extended or adjusted under 35 U.S.C. 154(b) by 258 days.

(21) Appl. No.: 11/793,814

(22) PCT Filed: Dec. 22, 2004

(86) PCT No.: PCT/SE2004/002005

§ 371 (c)(1),
(2), (4) Date: Dec. 7, 2007

(87) PCT Pub. No.: WO2006/068564

PCT Pub. Date: Jun. 29, 2006

(65) Prior Publication Data

US 2008/0143305 A1    Jun. 19, 2008

(51) Int. Cl.
*G05F 1/70* (2006.01)
(52) U.S. Cl. ..................................... 323/210
(58) Field of Classification Search ................ 323/205, 323/207, 208, 209, 210, 211; 307/98, 109, 307/132 R, 132 E
See application file for complete search history.

(56) References Cited

U.S. PATENT DOCUMENTS

| | | | | |
|---|---|---|---|---|
| 4,636,708 A | * | 1/1987 | Whyte | 323/210 |
| 4,677,364 A | * | 6/1987 | Williams et al. | 322/47 |
| 5,420,495 A | | 5/1995 | Hingorani | |
| 5,670,864 A | * | 9/1997 | Marx et al. | 323/211 |
| 2004/0164718 A1 | | 8/2004 | McDaniel et al. | |

FOREIGN PATENT DOCUMENTS

DE    197 38 467    3/1999

OTHER PUBLICATIONS

International Search Report—Aug. 26, 2005.
PCT/IPEA/409—International Preliminary Report on Patentability—Jun. 28, 2006.
PCT/IPEA/408—Written Opinion of the International Preliminary Examining Authority—Feb. 2, 2007.
PCT/ISA/237—Written Opinion of the International Searching Authority—Sep. 1, 2005.

* cited by examiner

*Primary Examiner*—Gary L Laxton
(74) *Attorney, Agent, or Firm*—Venable LLP; Eric J. Franklin (57) ABSTRACT

An apparatus for reactive power compensation in an ac medium voltage power network. The apparatus includes a common connection; a first branch including a first switch, and a first capacitor; and a second branch including a second switch and a second capacitor.

16 Claims, 4 Drawing Sheets

ELECTRIC POWER FLOW CONTROL

CROSS-REFERENCE TO RELATED APPLICATIONS

This application is the national phase under 35 U.S.C. §371 of PCT/SE2004/002005 filed 22 Dec. 2005.

TECHNICAL FIELD

The present invention concerns reactive power compensation of an ac distribution or transmission system. More precisely the invention concerns a reactive power compensation including capacitive means and switching means for a shunt connection of the capacitive means to an ac distribution or transmission line. The capacitive means comprises a bank of a plurality of capacitor units. The switching means comprises a switching device in the form of a switchgear, a circuit breaker or a mechanical switch.

By an ac distribution system should be understood an electric network for transferring electric power in the rage of 6 kV to 72 kV, which range is considered to comprise the medium voltage (MV) range. By a transmission system should be understood an electric network for transferring electric power in the rage of 136 kV to 400 kV, which range is considered to comprise the high voltage (HV) range. The present invention especially concerns the reactive power compensation in a distribution system and in particular within the range of 6 kV to 36 kV. The apparatus is useable in static compensation plants (STATCOM).

BACKGROUND OF THE INVENTION

The use of capacitors for reactive power compensation is widely known in the prior art. The main reason for the reactive power compensation is the more efficient use of the electric lines for transfer of electric power. It may thus be installed for network losses reduction, for over-load relief and for starting of large motors. Since the reactive load is constantly varying during day and night the reactive power compensation apparatus must be capable of connecting a selectable capacitive reactance to the line. In order to make this possible a plurality of capacitor units are assembled in a capacitor bank where the capacitor units are organized in modules which are selectable connected or disconnected to the line.

The capacitor itself comprises two electrodes separated by a dielectric medium. A capacitor for use in high voltage comprises a plurality of packages of wounded electrodes and dielectrcicum. The packages are connected with each other and stacked alongside in a container filled with an insulating liquid. The capacitor contains internal fuses and pressure relief valves. The enclosure, which is a metal construction, is expandable to allow the insulating oil to expand by temperature. Sometimes this fluctuating expansion creates a fatigue breakdown of the container and the insulating liquid will leak out. The insulating oil is however flammable, especially at high temperatures Thus in order to provide sufficient cooling and to prevent the spread of fire the capacitor bank must be placed in the open.

The switching means is either a mechanical switch or a semiconducting switch. A mechanical switch comprises a pair of contact parts relatively moveable to each other and an actuator for moving the contact parts. A semiconducting switch comprises a semiconducting element that by an electric control signal resumes an open or a closed circuit. The choice is very much depending on the voltage range of operation. Thus for the low voltage (LV) range the choice of switching device is trivial. Either a mechanical switch such as a relay contactor or a semiconducting switch may be chosen depending on performance and cost.

From U.S. Pat. No. 5,420,495 a transmission line power flow controller is previously known. The controller includes a capacitor having a variable capacitive impedance selectively inserted in series with the line. This variable impedance is achieved by connecting and disconnecting a plurality of capacitor units. As a switching means a thyristor switch is used which is sufficient rapid and having a high rate of switching operations without failure?

The choice of a switching device in the MV and HV region is much more difficult. The semiconducting switches get more expensive by voltage and arrangements must be made for cooling. For MV and especially HV the semiconducting switch must contain a plurality of series connected elements that needs an extensive control equipment. The mechanical switch must be designed with a greater contacting surface and the contact parts must in the open position be separated by a greater distance. This result in a heavier construction and the actuator must be constructed to rapidly move the contact parts in a controlled way. There is also the problem with arcs arising between the contact parts, which arcs must be extinguished to achieve an open circuit. The arc damages the contact surface and often there must be a first set of contact parts for closing and opening the circuit and a second set of contact parts for handling the arc.

One such known mechanical switch is a circuit breaker. A circuit breaker is capable of connecting and interrupting a short-circuit current. Thus a circuit breaker is a heavy construction where the contact parts are contained in a breaking chamber filled with a protective gas and an actuator comprising a spring package for effecting the movement. The circuit breaker is designed especially for interrupting a short-circuit current. In a first sequence of the opening operation the contact parts are separated by the actuator and an electric arc will arise between the contact parts. In a second sequence of the opening operation the arc will be extinguished by a blast of the protective gas at a current zero crossing. Due to high acceleration and especially retardation forces the circuit breaker has a low rate of reliable switching operations before service is needed.

Another switching means is known as a mechanical switch or often known as just a switch. A switch is capable of connecting and interrupting a load current only. Normally a load current is much lower than a short-circuit current. Thus a switch must be protected by an upstream circuit breaker. A switch is a less heavy construction than a circuit breaker. It also comprises an actuator and a contact configuration which must be able to separate rapidly and to achieve an open contact distance that makes the switch free of re-striking. The acceleration and deceleration forces are lesser than the circuit breaker.

Known mechanical switching means are delicate in construction and provide a low rate of switching operations. This affects the way of controlling the reactive power compensation. Thus in order not to stress the switching means the capacitor bank is organized in fewer modules and the switching is restricted to a few occasions per day. Within the MV range there is also known a contactor for rapid switching of motors, furnaces and capacitor banks. The connecting equipment of a contactor comprises a pair of contact parts exposed in a vacuum chamber or a SF6 chamber. The contacts of a vacuum contactor are normally operated by a solenoid actuator. This reduces the number of mechanical parts involved in the operation maneuver and thus the vacuum contactor has a higher rate of operation before service is needed. However, the solenoid actuator comprising a rod of magnetizable material that is drafted into an electro magnet has a fair acceleration phase but a very abrupt retardation phase. The abrupt deceleration affects the long term performance of the contact parts. Thus a vacuum breaker normally has a short duration before maintenance is required.

Switching a capacitor bank may cause switching transients. Such transients may damage not only the switching means but also the capacitor means and cause tripping of a frequency converter overvoltage protection. The energizing switching of a capacitor is regarded at the time of connection as a short circuit. If then the potential on either side of the switching device in unequal there will be a sudden rush of current. Thereby the capacitor is generating a switching transient that comprises a current component and a voltage component. The rush-in current surge is of high amplitude and frequency and has a very short duration. Transients causing high over voltages could also occur when disconnecting a capacitor due to re-strikes in the switch/circuit breaker.

The actuator of a mechanical switch comprises a spring construction which is released to apply a moving force on one of the contact parts. By the release of the spring the contact part will continuously accelerate from a first position until it reaches a second position where the moveable contact part suddenly stops. The retardation force is severe and a potential damage of the breaker is obvious. This will affect the rate of switching operations before service is needed. Once the spring is released the movement of the contact cannot be controlled. In comparison to a projectile launched from a cannon the action could be described as ballistic. Thus with a ballistic actuator the movable contact part will be hurled away in a ballistic manner. Once the force has been released the movement of the moveable contact part cannot be controlled.

It is also known a magnetic actuator such as a solenoid. By this actuator an electromagnetic force is applied to the moveable contact part.

The force is applied the moveable part at the beginning of the movement and then decreases by the movement. The movement of the moveable contact part may be reckoned as a ballistic movement. By this is meant that the force which will move the contact part from the first position to the second position is applied at the very beginning of the movement.

With a ballistic actuator there is no possibility to alter the speed of the contact part once the movement has started. The movement of the moveable contact part has to be estimated in advance. Thus the spring force or the magnetic force has to be released in advance in order for the switch to assume an open or closed status some moments later. However the contact speed may be affected by the latching mechanism, the spring condition, the magnetic force achieved and by the current strength to handle by the contact part. Thus each time the actuator is performing a closing or an opening operation the time period for the contact part to reach its second position is varying in an uncontrolled way.

SUMMARY OF THE INVENTION

A primary object of the present invention is to provide a reactive power compensation apparatus that adjust the reactive compensation of an ac line synchronously in order to prevent transient overvoltages or over-currents to occur. Further the apparatus should perform a high rate of operations before maintenance is needed. The reactive compensation should be step-wise controllable such that a whole number of capacitive reactances is accessible and connectable at any time and preferably at a plurality of occasions each day.

This object is achieved according to the invention by a control apparatus or by a method.

According to the invention a switch with a controllable actuator is used in combination with electric sensing means to synchronize the connection and the disconnection of a capacitor means. With such a controllable switch the exact moment of connection or disconnection is achieved. The reactive power compensation apparatus is arranged in at least two electrical branches, each containing a controllable switch and a capacitive means. The combination of the connectable capacitive means offers a plurality of adjustment configurations of the reactive power compensation. With even more branches comprising capacitive means of different capacitance offers a whole variety of possible reactance configurations.

In one embodiment the switching means of the reactive power compensation apparatus comprises an actuator that is operated by a continuously controllable force during the movement of the moveable contact part. By this controllable force an exact instant of opening the contacts as well as closing the contacts is achieved. In one embodiment the actuator comprises an electric circuit, a magnetic circuit and a mechanical circuit in co-operation. The mechanical circuit is in close connection with the moveable contact part such that when moving the mechanical circuit the moveable contact is moved simultaneously. When energy is introduced to the electric circuit the magnetic circuit will affect a force on the mechanical circuit which will accelerate the moveable contact part. When energy is transferred the other way the mechanical device and the moveable contact part will decelerate. Thus by controlling the energy transfer the amount of acceleration and the amount of retardation is controllable in a predictable way. By this control the exact moment of contact closing or contact separation is achieved.

Each switching operation comprises an acceleration phase and a retardation phase. In a preferred embodiment the operation also comprises a linear phase placed between the acceleration phase and the retardation phase. In this way the moveable contact part will not only achieve a soft start but also a soft stop. The mechanical system will then be spared from destructive movements and thus achieves a high rate of operation.

The mechanical circuit comprises sensors for informing the control unit the position and the speed of the moveable contact part. For each operation there is an estimated movement profile for the movement of the moveable contact part. From this estimate the starting instant is defined for the actuator to achieve a synchronous switching. If for some reason the actual movement is deviating from the movement profile the control unit may increase or decrease the moving force on the actuator.

In an embodiment of the invention each capacitor units comprises a plurality of electrodes in a container filled with an insulating medium containing a gel compound. By the gel compound the risk of leakage is minimized and the bank of capacitors may be housed in a closed container. In an embodiment of the invention the electrodes comprises thin sheets of a dielectric material on which is separate electrode islands are vaporized. The construction offers the electrodes to be self-healing after having been exposed to a partial discharge.

In a first aspect of the invention the object is achieved by an apparatus for controlling reactive power compensation comprising a first and second branch, each comprising a controllable switch and a capacitor means, electrical sensing means, and control means including a computer for controlling a synchronized connection and disconnection of the capacitor means. The arrangement of a first and second branch containing controllable switching means offers a plurality of reactive configurations and the use of a controllable switch offers a synchronized switching, which improve the rate of switching operations before maintenance is needed.

The capacitive means comprises a plurality of capacitor units arranged in connectable modules and the switching means comprises an actuator and a plurality of moveable contact parts which are moveable relative to each other. In an embodiment of the invention the actuator comprises a rotating electric machine having a stationary stator part and a rotatable rotor part in close mechanical connection with one contact part or a plurality of contact parts. In another embodiment of the invention at least one of the capacitor units comprises a plurality of electrodes in a container, the electrodes being surrounded by an insulating compound having a gelling agent.

In an embodiment of the invention the contact configuration comprises a first and second switch in series connection and a diode in a parallel path to the first switch. In a first period of time the first switch is opened and the current is commutated to the diode containing branch. In a second period of time when the diode is blocking the current the second switch is opened. The closing or opening operation is thus performed in two steps. By commutating the current to the diode branch the first switch does not have to perform a breaking operation but only a switching operation. Then in the second step the diode is performing the breaking operation and thus also the second switch has only to perform a switching operation.

In a further embodiment of the invention the contact configuration comprises a pair of contacts in a vacuum chamber known as a vacuum bottle interrupter. By having full control of not only the acceleration phase but also the deceleration phase the mechanical stress on the vacuum bottle interrupter is kept low. Thus by the application of the inventive actuator the already long service life time of the vacuum bottle interrupters still prolonged. As a result the rate of operation before service is even higher.

For both contact configurations, the diode switch and the vacuum bottle interrupter, the electrical stress on the contact part is less since the opening or closing may be performed in synchronization with the fundamental frequency of the ac current. When switching is performed in a synchronized way all components in the system gain less stressing effects.

In a further embodiment of the invention the apparatus comprises a plurality of shunt branches protected by a circuit breaker, where each branch comprises a controllable switching means and a capacitive means. In yet another embodiment of the invention the capacitor means comprises a bank of capacitor units that comprises electrodes insulated by a gel insulant in a plastic container. Thus by this arrangement the reactive power compensation apparatus with switches and capacitors may be placed indoors or in a freight container.

In a second aspect of the invention the object is achieved by a method for providing a reactive power compensation in an ac medium voltage network. The method comprises connection of a capacitor means and disconnection of the capacitor means, wherein the connection comprises determining the dc voltage of the capacitor, and controlling the closing operation to achieve a contact closing when the voltage on the connection line is equal to the dc voltage of the capacitor. In a further embodiment of the method the disconnection of the capacitor means comprises determining the current to the capacitor, and separating the contacts beginning at least one ninth of a half period of the fundamental frequency before a zero crossing of the current.

In a third aspect of the invention the objects is achieved by a computer program product containing instructions for a computer to perform the method described.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Figure 1:
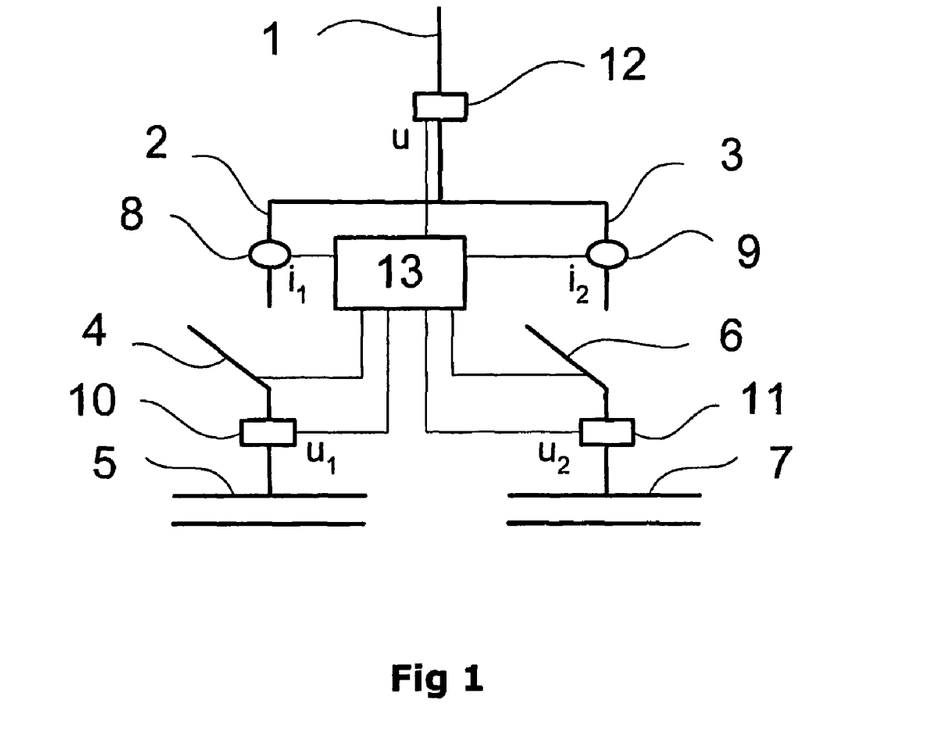
FIG. 1 is a principal circuit of a control apparatus according the invention.

An apparatus according to the invention is shown in FIG. 1. The apparatus comprises a common line 1 connectable to an ac line of a power network, a first branch 2 connected to a first capacitor 5 and a second 3 branch connected to a second capacitor 7. The first branch comprises a first controllable switch 4, a first voltage sensor 10 and a first current sensor 8. The second branch comprises a second controllable switch 6, a second voltage sensor 11 and a second current sensor 9. The common line comprises a common voltage sensor 12. The apparatus also comprises a control unit 13 for receiving information from the sensors and for effecting the closing and opening operations. Thus the control unit contains calculating means such as a computer.

By a controllable switch should be understood a mechanical switch comprising a pair of contact parts and an actuator which action is controllable throughout the movement of the contacts in a closing or an opening operation. Thus by a controllable switch the exact moment of contact closing or contact separation is not only predictable but also achievable. As an example, the actuator of a controllable switch comprises a rotating electric machine with its shaft is connected to one of the contact parts by a crank lever.

Closing and opening circuit breakers are transient phenomenon which sometimes causes transient overcurrents or overvoltages. If transient overcurrents or overvoltages will occur depends on the instant of closing a breaker relative the phase angle of the voltage or the instant of contact separation relative the phase angle of the current when opening a breaker.

It is well known that synchronized closing and opening reduce the stress of the products in the system and reduce the disturbances in voltages. Synchronized closing of circuit breakers is used for some specific applications like capacitors, transformers and shunt reactors especially for high voltage circuit breakers. The benefits of using synchronized opening of circuit breakers is being discussed but not implemented for medium voltage circuit breakers.

Figure 2:
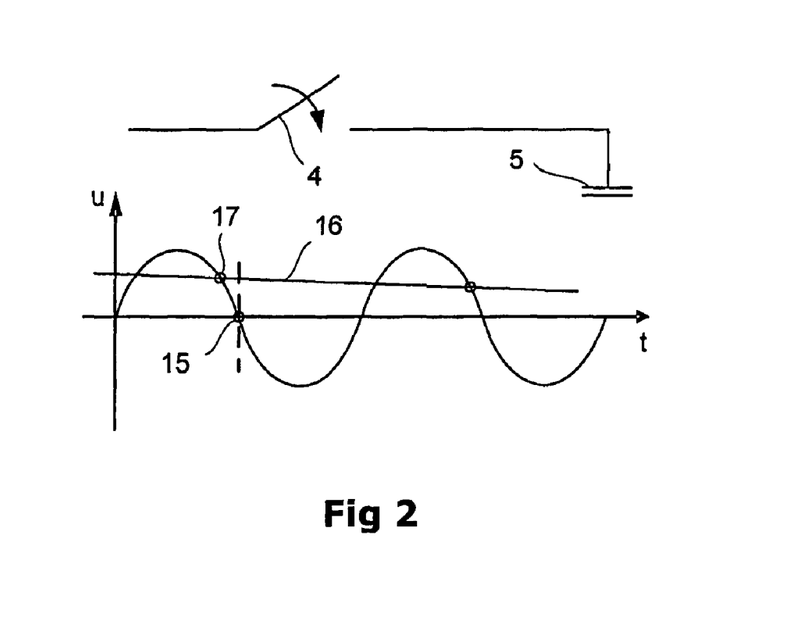
FIG. 2 is an example of a closing action of the switch.

An electric circuit comprising a controllable switch 4 and a capacitor 5 is shown in FIG. 2. The sine curve of the ac voltage by time is shown in the lower part of figure. A synchronized closing of the switch is when the ac voltage of the line is equal to the dc voltage of the capacitor. Providing that the capacitor is completely emptied, that is the dc voltage of the capacitor is zero, the synchronized switching point is at a zero crossing of the ac voltage. Provided, however, that the capacitor possesses a residual dc voltage, as represented by the line 16 in the figure, a synchronized switching point would be when the ac voltage and the dc voltage of the capacitor is equal which in this case is when the ac sine curve crosses the line 16, which is represented by the point 17. In order to make contact in this point the main voltage and the voltage over the capacitor has to determined and compared.

The purpose of using a synchronized opening is to prevent re-strikes, which causes high transient overvoltages with high time derivatives of the voltages. Re-strikes occur when the recovery voltage across the breaker is higher than the voltage withstand capability between the contacts after the arc is extinguished at the current zero crossing. The voltage withstand capability increases with increasing distance between the breaker contacts. The risk for re-strikes is higher in the cases the breaker starts to open just before a current zero crossing. The conclusion is that the breaker should open at an instant before the current zero crossing to ensure a contact separation large enough to prevent re-strikes to occur.

Synchronized closing is very rare in medium voltage but synchronized opening is never used. The reasons are the lack of precision in the opening times for the breakers as well the lack of accuracy in predicting current zero crossings. Another reason is that it is difficult or even impossible to check the accuracy of the opening times for the circuit breaker during operation, since it difficult or even impossible to detect the instant of contact separation in the breaker. The reason is that the only thing that occurs during the instant the breaker contacts are separated until the current zero crossing is the arc voltage across the breaker of about only 15-20 V if vacuum interrupters are used. This voltage is extremely low compared to the system voltage and difficult to measure.

Figure 3:
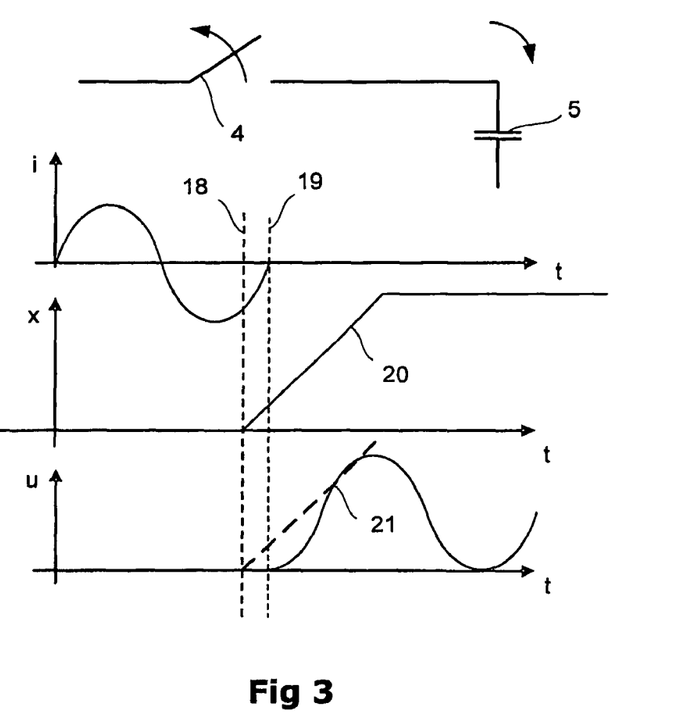
FIG. 3 is an example of an opening operation of the switch.

The same electric circuit as in FIG. 2 comprising a controllable switch 4 and a capacitor 4 is shown in FIG. 3. In the lower part of FIG. 3 three graphs are shown by way of example representing the current i by time t, the contact opening x by time t and the voltage u by time t. To avoid a re-strike the contact separation should start at an instant 18 before the current zero crossing 19. In the graphs the contact opening behavior 20 has been transferred to the voltage graph. After a current zero crossing and while the contacts are separating the voltage increases over the contact parts. To avoid a re-strike the distance between the contact parts must be greater than the voltage stress over the contact parts. Thus at any point 21 where the graph of the contact separation behavior crosses the voltage graph, the voltage strength between the contact parts must be greater than the voltage over the contact parts.

Figure 4:
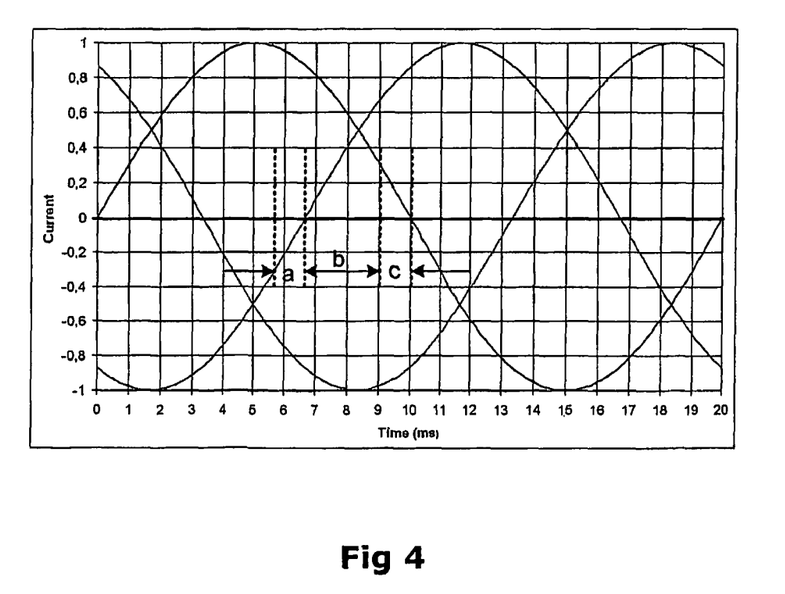
FIG. 4 is diagram showing time periods suitable for starting an opening operation.

In FIG. 4 the current by time of a three phase system is showed. In the figure is marked three different time windows a, b and c to show where an opening action could be initiated and where it should be avoided. If the time window a before the current zero crossing that should be prevented is 1 ms, which is about one ninth of half a period of the fundamental frequency of the alternating current. Then the time window b when the contact separation could start is 2.3 ms which is about two ninth of a period of the fundamental frequency. If the contact separation starts too early then another phase will become the first interrupting phase and the instant for the contact separation is moved into the dangerous time window c, which is equal to time window a, for that phase. It is important to reach an accurate synchronization of the breaker during the life time of the breaker to prevent re-strikes and not making it worse by hitting the not permitted time window at each opening of the breaker.

The accuracy of the synchronization depends on:
1. The accuracy of the current zero detection.
2. The distribution of the contact separation time between operations.
3. Changes in the contact separation time due to contact erosion during the life time of the breaker.

To hit a time window b of 2.3 ms does not seem to be a difficult task. If the errors are adding, however, it could be likely to hit the forbidden time windows a and c.

The electric motor drives for circuit breakers open new possibilities for synchronized switching. The electric motor drive has control of the contact motion both for the instant when the contacts start to move and the time required for the closing and opening. The result is that the time delay from the instant the open/close signal is given until the contacts start to move can be kept constant with a negligible time distribution which is important for the synchronized opening. For the synchronized closing also the distribution for the time required for the closing of the contacts is adding to the distribution of the time delay. The motor drive ensures a constant time for the contact closing with a negligible time distribution enabling a synchronized closing with very good accuracy.

The switch is the key component, and until now there has not been any product fulfilling the demands for the switch. The different applications of the step-wise controllable capacitor have different ratings of the switches.

There are some common properties independent of the applications:
1. The switches have to have a high number of operations to be able to utilize the reactive power control possibility.
2. The switch should only be able to interrupt nominal currents but it should withstand short circuit currents in closed state.
3. A short circuit in the capacitor banks will be interrupted by the circuit breaker in the incoming feeder.
4. Transient free energizing of the capacitors through synchronized closing.
5. Re-strike free disconnection of the capacitors through synchronized opening.

The circuit breaker at the incoming feeder for the capacitors can be replaced by a fuse in series with each switch.

Voltage and current transformers are required for the synchronized switching, and for the reactive power control. The current in all feeders will be measured as well as the voltage at the bus. One control system is needed for each switch and a control system for the reactive power control, which send an open or close signal to the switch control.

A measurement of the voltage across the capacitors is required for a synchronized re-energizing of a capacitor that is not fully discharged. For the diode switch only the sign of the voltage is required.

The high number of operations limits the possible switching technologies to be used. Contactors have a high number of operations but they are out of the question due to the system voltage demand up to 36 kV and the lack of synchronized switching. Transient overvoltages are associated with energizing and de-energizing of capacitors. The step-wise controllable capacitor, should not cause any transient over voltages. This can be achieved by synchronized switching, both when closing and opening the breaker.

There is no product available today which fulfils the demands for switches in the step-wise controllable capacitor. There are however two promising technologies developed, which would be very suitable for use in the step-wise controllable capacitor. The first one is the diode type breaker and the second one is a conventional vacuum circuit breaker but with the drive replaced with the motor drive used for the diode type breaker.

Figure 5:
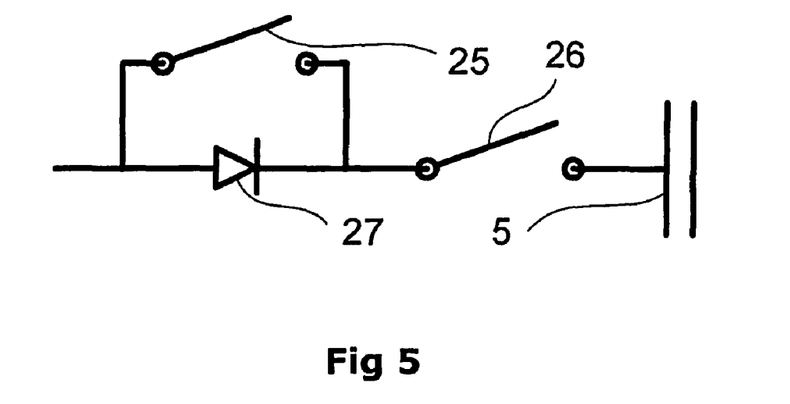
FIG. 5 is a description of a diode switch.

The diode type breaker shown in FIG. 5 is ideal for switching capacitors. The breaker comprises a first witch 25 and a second switch 26 in a series connection and with a diode 27 in a parallel connection to the first switch. The diode gives a synchronized and transient free energizing of the capacitors. The diode breaker could be used for energizing a capacitor that is not discharged. In this case only the polarity of the charged capacitor has to be known but not the voltage. The diode will also assure a re-strike free disconnection of the capacitors. The diode breaker also enables a high number of operations. The cost for the diode could be kept at a minimum since the up-stream circuit breaker takes care of any short-circuits. The diode switch requires measurement of both current and voltage for the closing and the opening. The opening and closing of the diode switch require that the contact movement is synchronized with the current through the closed switch and the voltage across the open switch. The synchronized contact movement minimizes the stress on the switch.

Figure 6:
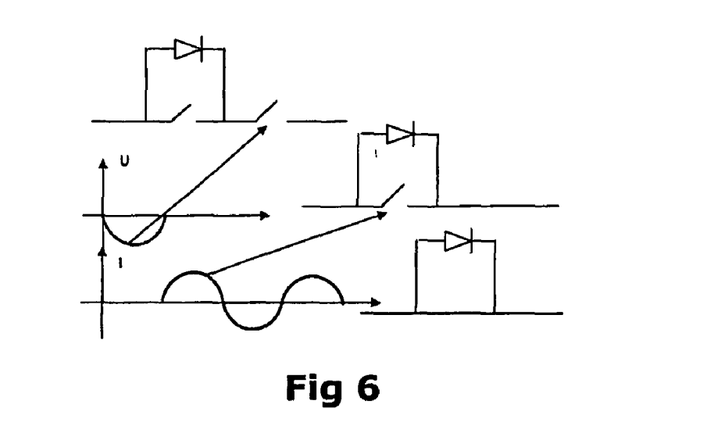
FIG. 6 is the closing operation of the diode switch.

A closing operation of the diode switch is shown in FIG. 6. When performing a synchronized closing of the switch the switch is closed with the diodes in blocking state. The current start to flow when the diodes start to conduct and the conducting diodes will be by-passed by closing the switch in parallel with the diodes.

Figure 7:
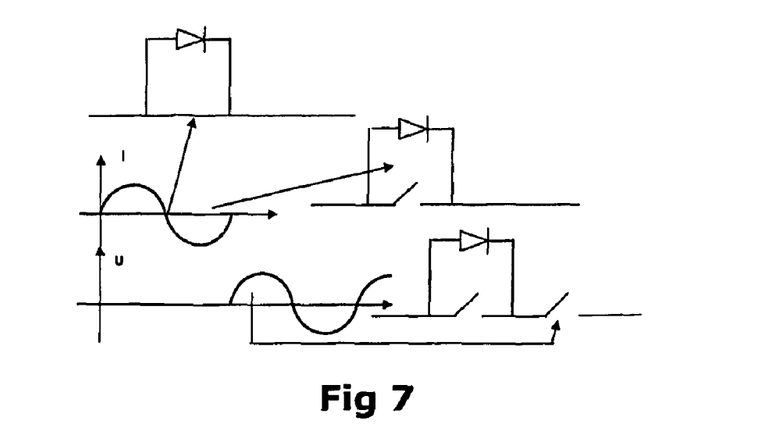
FIG. 7 is the opening operation of the diode switch.

An opening operation of the diode switch is shown in FIG. 7. The opening of the diode switch requires that the opening of the two contacts is synchronized with the current through the switch and the voltage across the switch. The first opening contact is the contact in parallel with the diode. The contact separation should occur in time window close to the current zero crossing to prevent arcing in the contact and to enable commutation of the current into the diode. The second contact should open when the diode has switched into the blocking state and the current through the switch is zero to prevent arcing in the contact. The contact has to open within a time window after the diode has switched into the blocking state and before it has switched into the conducting state. The reason is that the contact separation has to be large enough to withstand the recovery voltage when the diode switch to the conducting state at the voltage zero crossing.

A synchronized vacuum breaker/interrupter with a motor drive will have the same performance as the diode breaker. The large number of operations for the vacuum interrupter is achieved by the smooth acceleration and breaking of the moving contact. This reduces the stress of the bellow and the bouncing of the contact when closing.

The controlled and measured motion of the motor drive in combination with the measurement of voltages and currents enable a transient free switching. The closing of the switch will be at zero voltage across the switch. The opening of the switch will be during a time window before the current zero crossing ensuring a contact separation large enough to prevent re-strikes to occur.

In a preferred embodiment of the invention the capacitor comprises a plurality of electrodes in a container filled with an insulating compound with a gelling agent. The insulating gel would not come out in case of a leakage in the container. This enables the capacitors as well as all switching and sensing equipment to be installed in a metal enclosure such as a freight container. The switch technology could of course also be used with conventional and outdoor capacitors for new projects as well as for retrofit for old capacitor banks.

Figure 8:
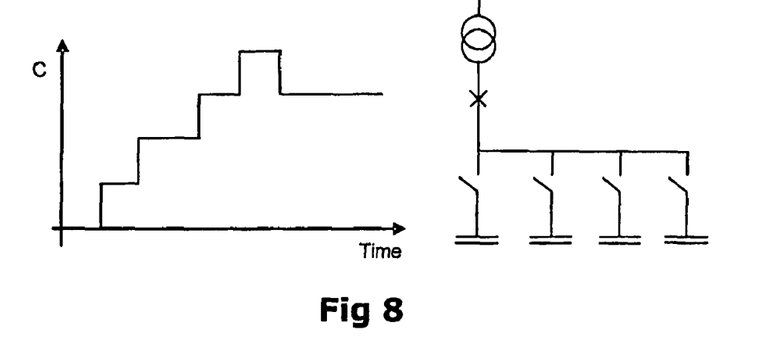
FIG. 8 is an example of typical control system according to the invention.
Figure 9:
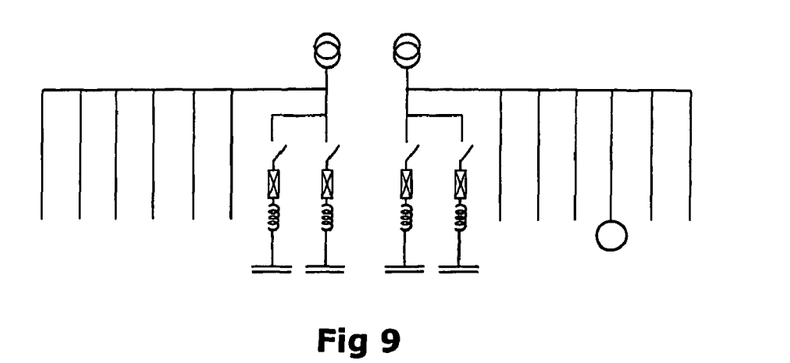
FIG. 9 is another example of a control system.

An embodiment of a step-wise controllable apparatus for reactive power compensation is shown in FIG. 8. The apparatus comprises four branches, each containing a switch and a capacitor means. The apparatus is connected to the ac line via a transformer and a circuit breaker. In a further embodiment shown in FIG. 9 the reactive power compensation apparatus comprises two branches, each connected to an ac line via a transformer. Each branch comprises sub-branches comprising also an inductor means. The sub-branches are connected in parallel to a plurality of distribution lines. Thus in this configuration the start of a large electric motor on a distribution line may be assisted by the connectable capacitor means in a parallel line.

Figure 10:
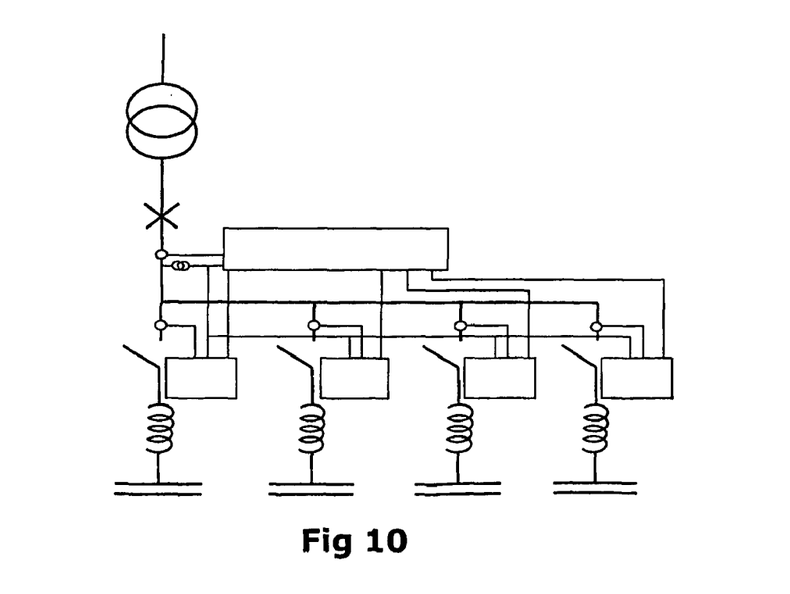
FIG. 10 is a further example of a control system.

Another embodiment of the invention is shown in FIG. 10. In this embodiment the control unit receives information from the ac connection and is separately controlling four branches containing a controllable seitch, an inductor and a capacitor.

Although favorable the scope of the invention must not be limited by the embodiments presented but contain also embodiments obvious to a person skilled in the art.

The invention claimed is:

1. An apparatus for reactive power compensation in an AC medium voltage power network, the apparatus comprising:
   a first branch comprising a first controllable switch, a first capacitor, and a first voltage sensor to determine a DC voltage of the first capacitor;
   a second branch comprising a second controllable switch, a second capacitor, and a second voltage sensor to determine a DC voltage of the second capacitor;
   a common line connecting the first branch and the second branch to an AC line of the power network, the common line comprising a common voltage sensor; and
   a control unit for receiving information from the first voltage sensor, the second voltage sensor and the common voltage sensor and for controlling the closing of the first controllable switch or the second controllable switch when an AC voltage of the common line is equal to the DC voltage of the first capacitor or the second capacitor, respectively.

2. The apparatus according to claim 1, wherein the first branch further comprises a first current sensor and the second branch further comprises a second current sensor.

3. The apparatus according to claim 1, wherein the first controllable switch comprises an actuator comprising an electric rotating machine.

4. The apparatus according to claim 1, wherein the first controllable switch comprises an actuator comprising an electric linear machine.

5. The apparatus according to claim 1, wherein the first controllable switch comprises an actuator wherein movement of the actuator comprises a controlled acceleration phase and a controlled deceleration phase.

6. The apparatus according to claim 1, wherein the first capacitor and the second capacitor each comprise a plurality of capacitor units.

7. The apparatus according to claim 1, wherein the first capacitor and the second capacitor each comprise a plurality of electrodes separated by a dielectric medium in a container with an insulating gel.

8. The apparatus according to claim 7, wherein the apparatus is contained in a freight container.

9. The apparatus according to claim 1, wherein the first controllable switch and the second controllable switch each comprise a contact comprising a vacuum bottle interrupter.

10. The apparatus according to claim 1, further comprising:
    a diode in a parallel branch with the first switch.

11. The apparatus according to claim 1, wherein the first switch and the second switch are arranged in series.

12. A method for reactive power compensation in an AC medium voltage power network, the method comprising:
   determining a DC voltage of a first capacitor or a second capacitor;
   determining an AC voltage of a common line connected to an AC line; and
   connecting the first capacitor or the second capacitor to the AC line by closing a first controllable switch or a second controllable switch, wherein the first controllable switch or the second controllable switch is closed when the AC voltage of the common line is equal to the DC voltage of the first capacitor or the second capacitor.

13. The method according to claim 12, further comprising:
   determining an alternation of current to the first capacitor or the second capacitor;
   defining a time for a next current zero crossing; and
   separating contacts beginning at least one ninth of a half period of a fundamental frequency before a zero crossing of the current, thereby disconnecting one of the first capacitor or the second capacitor.

14. The method according to claim 13, wherein separating the contacts begins between one third and one ninth of a half period of the fundamental frequency.

15. A computer program product, comprising:
   a computer readable medium; and
   computer program instructions recorded on the computer readable medium and executable by a processor for carrying out a method for reactive power compensation in an AC medium voltage power network, the method comprising
   determining a DC voltage of a first capacitor or a second capacitor,
   determining an AC voltage of a common line connected to an AC line, and
   connecting the first capacitor or the second capacitor to the AC line by closing a first controllable switch or a second controllable switch, wherein the first controllable switch or the second controllable switch is closed when the AC voltage of the common line is equal to the DC voltage of the first capacitor or the second capacitor.

16. The computer program product according to claim 15, wherein the computer program instructions are further for providing the computer program instructions at least in part over a network.

* * * * *